(12) United States Patent
Kaniaru

(10) Patent No.: US 10,293,631 B2
(45) Date of Patent: May 21, 2019

(54) AGITATABLE COLORING UTENSIL

(71) Applicant: Rahab W Kaniaru, San Pablo, CA (US)

(72) Inventor: Rahab W Kaniaru, San Pablo, CA (US)

(*) Notice: Subject to any disclaimer, the term of this patent is extended or adjusted under 35 U.S.C. 154(b) by 52 days.

(21) Appl. No.: 15/469,449

(22) Filed: Mar. 24, 2017

(65) Prior Publication Data

US 2017/0274697 A1  Sep. 28, 2017

Related U.S. Application Data

(60) Provisional application No. 62/312,790, filed on Mar. 24, 2016.

(51) Int. Cl.
| | | |
|---|---|---|
| *B43K 29/00* | (2006.01) | |
| *B43K 8/04* | (2006.01) | |
| *B43K 8/22* | (2006.01) | |
| *G09B 1/00* | (2006.01) | |
| *G09B 11/00* | (2006.01) | |

(52) U.S. Cl.
CPC ............ *B43K 8/04* (2013.01); *B43K 8/22* (2013.01); *G09B 1/00* (2013.01); *G09B 11/00* (2013.01)

(58) Field of Classification Search
CPC .................................... B43K 8/04; B43K 8/22
USPC ........................................... 401/195, 1–2
See application file for complete search history.

(56) References Cited

U.S. PATENT DOCUMENTS

| | | | | | |
|---|---|---|---|---|---|
| 3,297,003 | A | * | 1/1967 | Benson | B43K 8/22 15/3 |
| 3,997,972 | A | * | 12/1976 | Jaunarajs | B43K 8/22 33/18.1 |
| 4,211,012 | A | * | 7/1980 | Alles | B41J 2/5056 118/211 |
| 5,208,987 | A | * | 5/1993 | Christen | B43K 7/005 33/18.1 |
| 5,933,970 | A | * | 8/1999 | Diresta | B43K 8/22 33/18.1 |
| 2016/0107476 | A1 | * | 4/2016 | Bussie | B43K 19/003 29/428 |

\* cited by examiner

*Primary Examiner* — Jennifer C Chiang

(57) ABSTRACT

An agitatable coloring utensil is an apparatus that spins the tip of a drawing, coloring, or writing utensil as the user is using the drawing, coloring, or writing utensil. The apparatus includes a tubular body, a marking tip, a motor, a portable power source, and at least one user control. The tubular body is the structural housing for the other component of the apparatus and allows the user to have a firm grasp of the apparatus while using the apparatus to write or draw. The motor is used to drive the rotation of the marking tip. The portable power source is used to electrically power the motor and allows the apparatus to be easily transportable by the user. The user control allows the user to either activate, deactivate, or adjust the rotation of the marking tip.

19 Claims, 5 Drawing Sheets

AGITATABLE COLORING UTENSIL

The current application claims a priority to the U.S. Provisional Patent application Ser. No. 62/312,790 filed on Mar. 24, 2016.

FIELD OF THE INVENTION

The present invention generally relates to a coloring utensil that is used for coloring books by either kids or adults. More specifically, the present invention provides a coloring utensil with a spinning tip that allows kids or adults to more quickly color their artwork.

BACKGROUND OF THE INVENTION

A favorite childhood past time is coloring. Filling in the drawings of a coloring book, free styling on a page of paper, a wall, a board, or a driveway is a common childhood activity. Though this is an enjoyable experience by many children, children are not the best at keeping the colors within defined lines. The main issue with coloring among children is the repeated and many movements of the drawing utensil, preventing the colors from staying within the defined lines. The only way to create accurately colored images is to practice. Practice however takes a lot of time.

Therefore, an objective of the present invention is to provide a drawing, coloring, or writing utensil with a spinning tip. The present invention is able to motivate children (who are reluctant drawers), kids with developmental disability, elderly people, and everyone else by providing them with a purpose to achieve a colored picture. The present invention helps its users with fine-motor development and good finger grip. The present invention also assists in the development of hand-and-eye coordination as the children learn to color within the specific area.

DETAILED DESCRIPTION OF THE INVENTION

Figure 1:
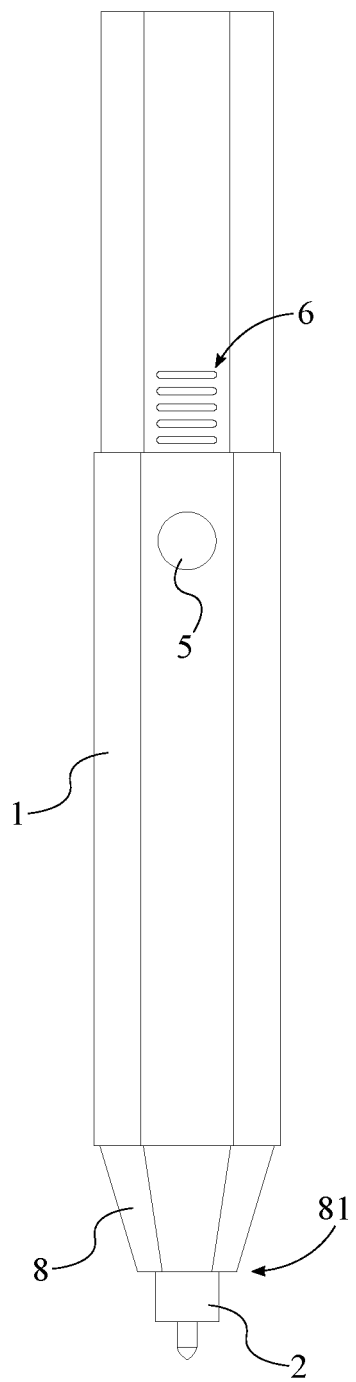
FIG. 1 is a side view of the present invention.
Figure 2:
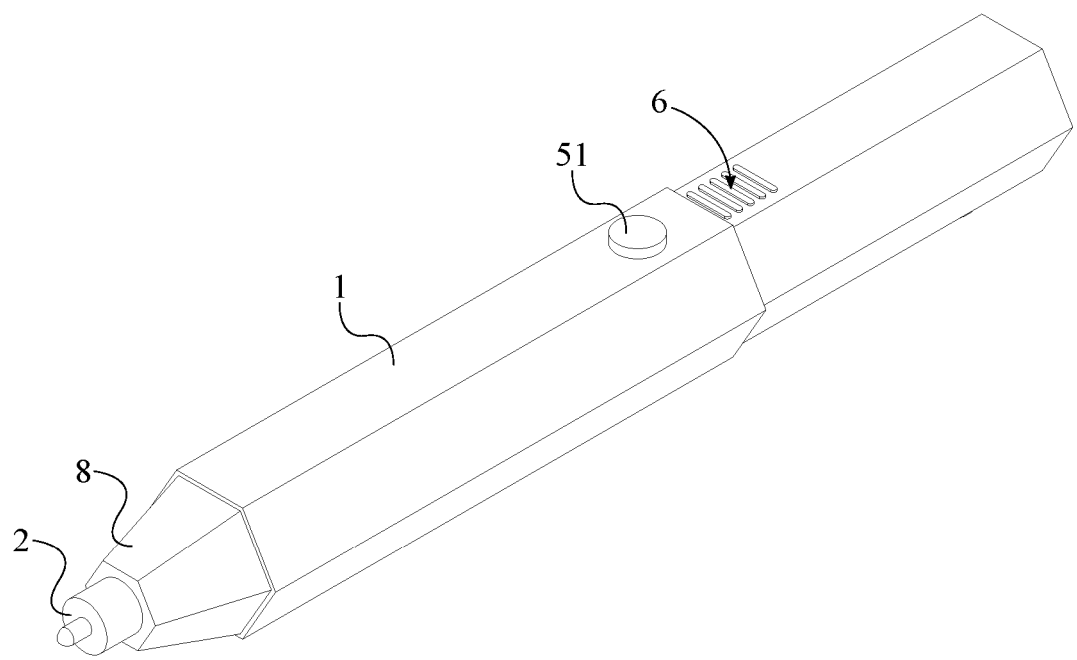
FIG. 2 is a top perspective view of the present invention.
Figure 3:
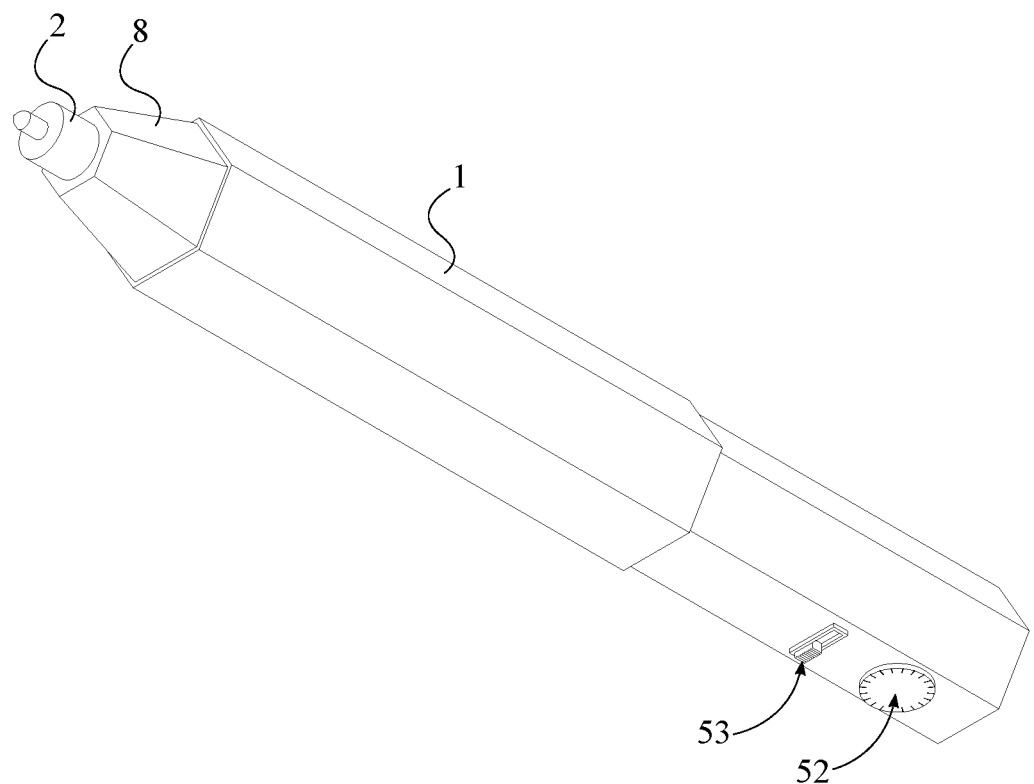
FIG. 3 is a bottom perspective view of the present invention.

All illustrations of the drawings are for the purpose of describing selected versions of the present invention and are not intended to limit the scope of the present invention.

As can be seen in FIG. 1 through 4, the present invention is an agitatable coloring utensil that allows a user to draw, color, or write with a rotating tip. The present invention comprises a tubular body 1, a marking tip 2, a motor 3, a portable power source 4, and at least one user control 5. The tubular body 1 is used as a structural housing for other components of the present invention and allows the user to grasp the present invention. The marking tip 2 is used to make marks onto a piece of paper, a canvas, or some other means of bearing those marks. The motor 3 allows the present invention to drive the rotation of the marking tip 2. The portable power source 4 provides the motor 3 with the necessary electrical power in order to rotate the marking tip 2. The at least one user control 5 allows the user to activate, deactivate, or adjust certain features of the present invention.

The general configuration of the aforementioned components allows the user to easily grasp and to draw, color, or write with the present invention while the marking tip 2 is rotating. A stator 32 of the motor 3 and the portable power source 4 are mounted within the tubular body 1, which effectively houses and affixes the stator 32 and the portable power source 4 within the confines of the present invention. The at least one user control 5 is laterally mounted onto the tubular body 1 so that the user is able to easily access the at least one user control 5 while grasping the present invention. Moreover, the marking tip 2 is mounted external to the tubular body 1, adjacent to an open end 12 of the tubular body 1, which allows the user to properly orient the marking tip 2 while grasping the present invention. The marking tip 2 is also torsionally coupled to a rotor 31 of the motor 3, which allows the motor 3 to drive the rotation of the marking tip 2. In addition, a rotation axis 21 of the marking tip 2 is positioned coincident with a central axis 13 of the tubular body 1. This configuration between the marking tip 2 and the tubular body 1 allows the present invention to affect the user's writing or drawing without interfering with the functionality of the marking tip 2. In order for the motor 3 to receive the necessary electrical power, the portable power source 4 is electrically connected to the motor 3. The at least one user control 5 is also electronically connected to the motor 3 so that the user is able to control and adjust different features related to the rotation of the marking tip 2.

Figure 4:
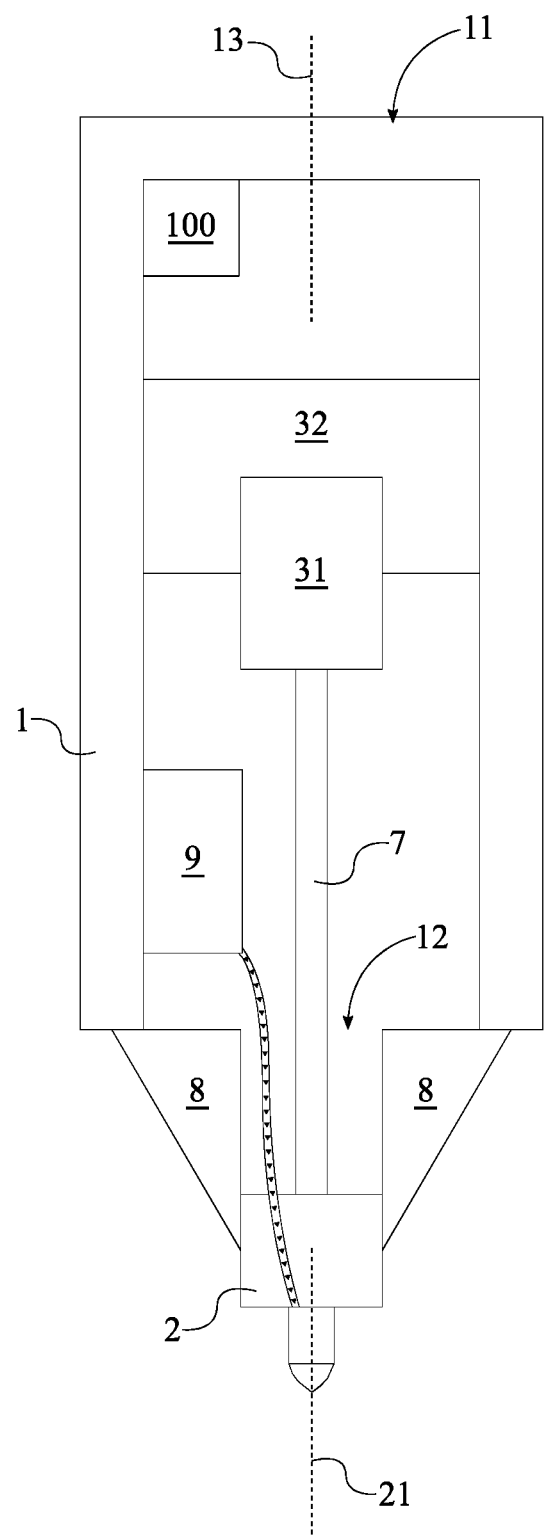
FIG. 4 is a cross-sectional schematic view of the present invention.

The present invention can be designed to transfer rotational motion from the rotor 31 to the marking tip 2 in a variety of configurations. In some embodiments, the present invention further comprises an axle 7, which is shown in FIG. 4. The axle 7 is a shaft that traverses along and within the tubular body 1. More specifically, the rotor 31 is terminally connected to the axle 7, and the marking tip 2 is terminally connected to the axle 7, opposite to the rotor 31. This allows the present invention to efficiently and effectively transfer rotational motion from the rotor 31 to the marking tip 2.

Excessive force is applied to the marking tip 2 as the user draws, colors, or writes with present invention. Thus, in some embodiments, the present invention further comprises a hollow conical setting 8, which is illustrated in FIG. 1 through 4. The hollow conical setting 8 is used to laterally reinforce the marking tip 2. Thus, the hollow conical setting 8 needs to be terminally mounted to the tubular body 1, adjacent to the open end 12, and needs to be mounted about the marking tip 2. This configuration between the tubular body 1, the hollow conical setting 8, and the marking tip 2 allows the present invention to structurally stabilize the marking tip 2 as the user draws, colors, or writes with the present invention. Moreover, the marking tip 2 traverses out of an apex 81 of the hollow conical setting 8, while the apex 81 of the hollow conical setting 8 is positioned offset from the open end 12. This allows the marking tip 2 to effectively protrude out of the hollow conical setting 8 so that the user can continue to draw, color, or write with the present invention. In addition, the configuration of the hollow conical setting 8 and the placement of the hollow conical setting 8 on the present invention provides the user with better control of the marking tip 2 because the user is able to tightly grasp the present invention around the hollow conical setting 8.

The marking tip 2 can be from a variety of drawing or writing utensils. Some examples of these utensils include, but is not limited to, a pencil, a pen, a crayon, a piece of chalk, or a pigmented oil. However, in the preferred embodiment of the present invention, the marking tip 2 is an ink-soaked tip of a marker. Thus, the preferred embodiment of the present invention further comprises an ink-retaining reservoir 9, which allows a supply of ink to be stored within the present invention as can be seen in FIG. 4. The ink-retaining reservoir 9 is mounted within the tubular body 1 and is in fluid communication with the marking tip 2 so that the marking tip 2 is able to continuously receive the supply of ink from the ink-retaining reservoir 9. In an alternate embodiment, the present invention may comprise a plurality of marking tips, wherein each marking tip is a different kind of marking tip. These different kind of marking tips may be used to draw, color, or write in different colors, with different line strokes, or in different marking textures. Also in the alternate embodiment, the present invention needs to further comprise a fixed adapter so that the user can readily detach one marking tip and readily attach a different marking tip. Also in the alternate embodiment, the plurality of marking tips may be housed within the tubular body 1 and may be accessed through a door integrated into the tubular body 1.

Figure 5:
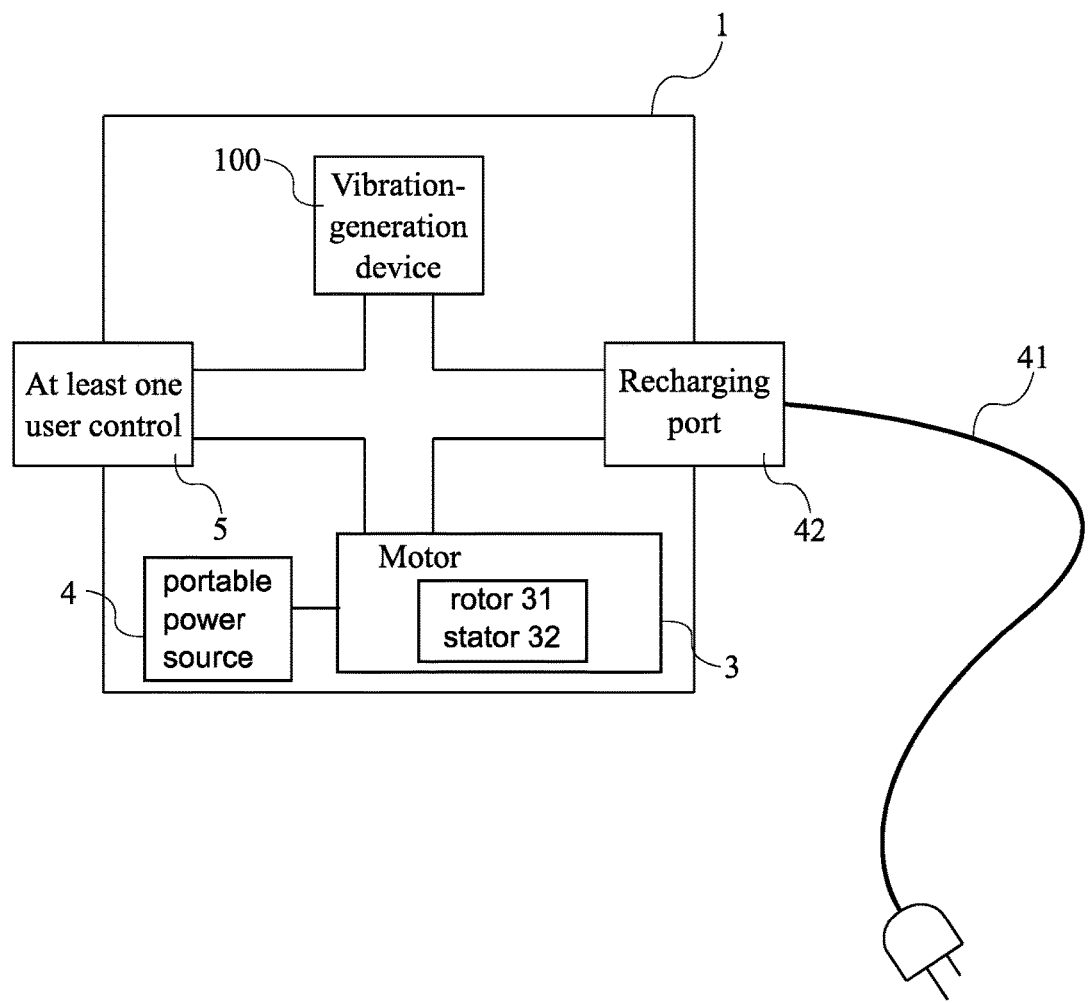
FIG. 5 is a block diagram for the electrical components of the present invention.

The present invention is designed to be handheld and portable because a drawing or writing utensil that is tethered by a power cord 41 would be too difficult to make precise hand movements. Thus, the preferred embodiment of the present invention comprises a power cord 41 and a recharging port 42, while the portable power source 4 is a rechargeable battery. As can be seen in FIG. 5, the recharging port 42 is integrated into the tubular body 1 so that the user is able to readily connect or disconnect the power cord 41 to the present invention. Thus, the power cord 41 is electrically connected to the rechargeable port, which is electrically connected to the rechargeable battery. This allows the power cord 41 to refill the rechargeable battery with the electrical energy. In some embodiment of the present invention, the tubular body 1 has a door that allows a user to access and selectively replace the rechargeable battery.

The present invention is designed with a variety of user controls 5 so that the user can adjust the settings of the present invention while drawing or writing with the present invention. As can be seen FIG. 2, one kind of the user control 5 is an activation switch 51 that is used to turn on or off the rotation of the marking tip 2. Thus, the portable power source 4 needs to be electrically connected to the motor 3 through the activation switch 51 so that the activation switch 51 is able to either allow or prevent flow of electrical current between the portable power source 4 and the motor 3. As can be seen FIG. 3, another kind of user control 5 is the adjustment dial 52 that is used to alter the rotational speed of the rotor 31. Thus, the adjustment dial 52 needs to be operatively coupled to the motor 3 so that each clickable increment on the adjustment dial 52 corresponds to a specific rotational speed of the rotor 31. Adjusting the rotational speed of the rotor 31 consequently allows the user to adjust the rotational speed of the marking tip 2. As can be seen FIG. 3, another kind of user control 5 is a reverse switch 53 that is used to alter the rotational direction of the rotor 31 between a clockwise direction and a counterclockwise direction. Thus, the reverse switch 53 needs to be operatively coupled to the motor 3 so that each flip of the reverse switch 53 allows the user to change the rotational direction of the rotor 31. Changing the rotational direction of the rotor 31 consequently allows the user to change the rotational direction of the marking tip 2.

The present invention can also be designed to agitate the marking tip 4 in other than rotating the marking tip 4. As can be seen in FIGS. 4 and 5, another way to agitate the marking tip 4 is for the present invention to further comprise a vibration-generating mechanism 100, which is used to shake the tubular body 1 and the marking tip 2 as the user draws, colors, or writes with the present invention. The vibration-generating mechanism 100 is mounted within the tubular body 1 so that the vibration-generating mechanism 100 is able to vibrate the tubular body 1 and consequently vibrate the other components of the present invention. The portable power source 4 is electrically connected to the vibration-generating mechanism 100 so that the present invention is able to electrically power the vibration-generating mechanism 100. Moreover, the at least one user control 4 is electronically connected to the vibration-generating mechanism 100, which allows the user to activate, deactivate, or adjust some feature of the vibration-generating mechanism 100. Another way to agitate the marking tip 4 is for the present invention to be configured to move the marking tip 4 back and forth in a sideways motion, which would be perpendicular to the central axis 13 of the tubular body 1.

Although the invention has been explained in relation to its preferred embodiment, it is to be understood that many other possible modifications and variations can be made without departing from the spirit and scope of the invention as hereinafter claimed.

What is claimed is:

1. An agitatable coloring utensil comprises:
   a tubular body;
   a marking tip;
   a motor;
   a portable power source;
   at least one user control;
   an ink-retaining reservoir;
   the tubular body comprises an open end and a closed end;
   the motor comprises a stator and a rotor;
   the stator and the portable power source being mounted within the tubular body;
   the at least one user control being laterally mounted onto the tubular body;
   the marking tip being mounted external to the tubular body, adjacent to the open end;
   the marking tip being torsionally coupled to the rotor;
   a rotation axis of the marking tip being positioned coincident with a central axis of the tubular body;
   the portable power source being electrically connected to the motor;
   the at least one user control being electronically connected to the motor;
   the ink-retaining reservoir being mounted within the tubular body; and
   the ink-retaining reservoir being in fluid communication with the marking tip.

2. The agitatable coloring utensil as claimed in claim 1 comprises:
   a grip; and
   the grip being laterally integrated about the tubular body.

3. The agitatable coloring utensil as claimed in claim 1 comprises:
   an axle;
   the axle traversing along and within the tubular body;
   the rotor being terminally connected to the axle; and
   the marking tip being terminally connected to the axle, opposite to the rotor.

4. The agitatable coloring utensil as claimed in claim 1 comprises:
   a hollow conical setting;
   the hollow conical setting being terminally mounted to the tubular body, adjacent to the open end;

the hollow conical setting being mounted about the marking tip;
the marking tip traversing out of an apex of the hollow conical setting; and
the apex of the hollow conical setting being positioned offset from the open end.

5. The agitatable coloring utensil as claimed in claim 1 comprises:
a power cord;
a recharging port;
the portable power source being a rechargeable battery;
the recharging port being integrated into the tubular body;
the recharging port being electrically connected to the rechargeable battery; and
the power cord being electrically connected to the recharging port.

6. The agitatable coloring utensil as claimed in claim 1 comprises:
the at least one user control comprises an activation switch; and
the motor and the portable power source being electrically connected to each other through the activation switch.

7. The agitatable coloring utensil as claimed in claim 1 comprises:
the at least one user control comprises an adjustment dial; and
the adjustment dial being operatively coupled to the motor, wherein the adjustment dial is used to adjust a rotational speed of the rotor.

8. The agitatable coloring utensil as claimed in claim 1 comprises:
the at least one user control comprises a reverse switch; and
the reserve switch being operatively coupled to the motor, wherein the reserve switch is reverse a rotational direction of the rotor.

9. The agitatable coloring utensil as claimed in claim 1 comprises:
a vibration-generating mechanism;
the vibration-generating mechanism being mounted within the tubular body;
the portable power source being electrically connected to the vibration-generating mechanism; and
the at least one user control being electronically connected to the vibration-generating mechanism.

10. An agitatable coloring utensil comprises:
a tubular body;
a marking tip;
a motor;
a portable power source;
at least one user control;
a vibration-generating mechanism;
an axle;
the tubular body comprises an open end and a closed end;
the motor comprises a stator and a rotor;
the stator and the portable power source being mounted within the tubular body;
the at least one user control being laterally mounted onto the tubular body;
the marking tip being mounted external to the tubular body, adjacent to the open end;
the marking tip being torsionally coupled to the rotor;
a rotation axis of the marking tip being positioned coincident with a central axis of the tubular body;
the portable power source being electrically connected to the motor;
the at least one user control being electronically connected to the motor;
the vibration-generating mechanism being mounted within the tubular body;
the portable power source being electrically connected to the vibration-generating mechanism;
the at least one user control being electronically connected to the vibration-generating mechanism;
the axle traversing along and within the tubular body;
the rotor being terminally connected to the axle; and
the marking tip being terminally connected to the axle, opposite to the rotor.

11. The agitatable coloring utensil as claimed in claim 10 comprises:
a grip; and
the grip being laterally integrated about the tubular body.

12. The agitatable coloring utensil as claimed in claim 10 comprises:
a hollow conical setting;
the hollow conical setting being terminally mounted to the tubular body, adjacent to the open end;
the hollow conical setting being mounted about the marking tip;
the marking tip traversing out of an apex of the hollow conical setting; and
the apex of the hollow conical setting being positioned offset from the open end.

13. The agitatable coloring utensil as claimed in claim 10 comprises:
an ink-retaining reservoir;
the ink-retaining reservoir being mounted within the tubular body; and
the ink-retaining reservoir being in fluid communication with the marking tip.

14. The agitatable coloring utensil as claimed in claim 10 comprises:
a power cord;
a recharging port;
the portable power source being a rechargeable battery;
the at least one user control comprises an activation switch, an adjustment dial, and a reverse switch;
the recharging port being integrated into the tubular body;
the recharging port being electrically connected to the rechargeable battery;
the power cord being electrically connected to the recharging port;
the motor and the portable power source being electrically connected to each other through the activation switch;
the adjustment dial being operatively coupled to the motor, wherein the adjustment dial is used to adjust a rotational speed of the rotor; and
the reserve switch being operatively coupled to the motor, wherein the reserve switch is reverse a rotational direction of the rotor.

15. An agitatable coloring utensil comprises:
a tubular body;
a marking tip;
a motor;
a portable power source;
at least one user control;
a vibration-generating mechanism;
an ink-retaining reservoir;
the tubular body comprises an open end and a closed end;
the motor comprises a stator and a rotor;
the stator and the portable power source being mounted within the tubular body;

the at least one user control being laterally mounted onto the tubular body;

the marking tip being mounted external to the tubular body, adjacent to the open end;

the marking tip being torsionally coupled to the rotor;

a rotation axis of the marking tip being positioned coincident with a central axis of the tubular body;

the portable power source being electrically connected to the motor;

the at least one user control being electronically connected to the motor;

the vibration-generating mechanism being mounted within the tubular body;

the portable power source being electrically connected to the vibration-generating mechanism;

the at least one user control being electronically connected to the vibration-generating mechanism;

the ink-retaining reservoir being mounted within the tubular body; and the ink-retaining reservoir being in fluid communication with the marking tip.

16. The agitatable coloring utensil as claimed in claim 15 comprises:

a grip; and the grip being laterally integrated about the tubular body.

17. The agitatable coloring utensil as claimed in claim 15 comprises:

a hollow conical setting;

the hollow conical setting being terminally mounted to the tubular body, adjacent to the open end;

the hollow conical setting being mounted about the marking tip;

the marking tip traversing out of an apex of the hollow conical setting; and the apex of the hollow conical setting being positioned offset from the open end.

18. The agitatable coloring utensil as claimed in claim 15 comprises:

an axle;

the axle traversing along and within the tubular body;

the rotor being terminally connected to the axle; and the marking tip being terminally connected to the axle, opposite to the rotor.

19. The agitatable coloring utensil as claimed in claim 15 comprises:

a power cord;

a recharging port;

the portable power source being a rechargeable battery;

the at least one user control comprises an activation switch, an adjustment dial, and a reverse switch;

the recharging port being integrated into the tubular body;

the recharging port being electrically connected to the rechargeable battery;

the power cord being electrically connected to the recharging port;

the motor and the portable power source being electrically connected to each other through the activation switch;

the adjustment dial being operatively coupled to the motor, wherein the adjustment dial is used to adjust a rotational speed of the rotor; and the reserve switch being operatively coupled to the motor, wherein the reserve switch is reverse a rotational direction of the rotor.

* * * * *